April 19, 1949.  E. F. MARTINEC  2,467,437
SKATE WHEEL STRUCTURE
Filed July 26, 1946
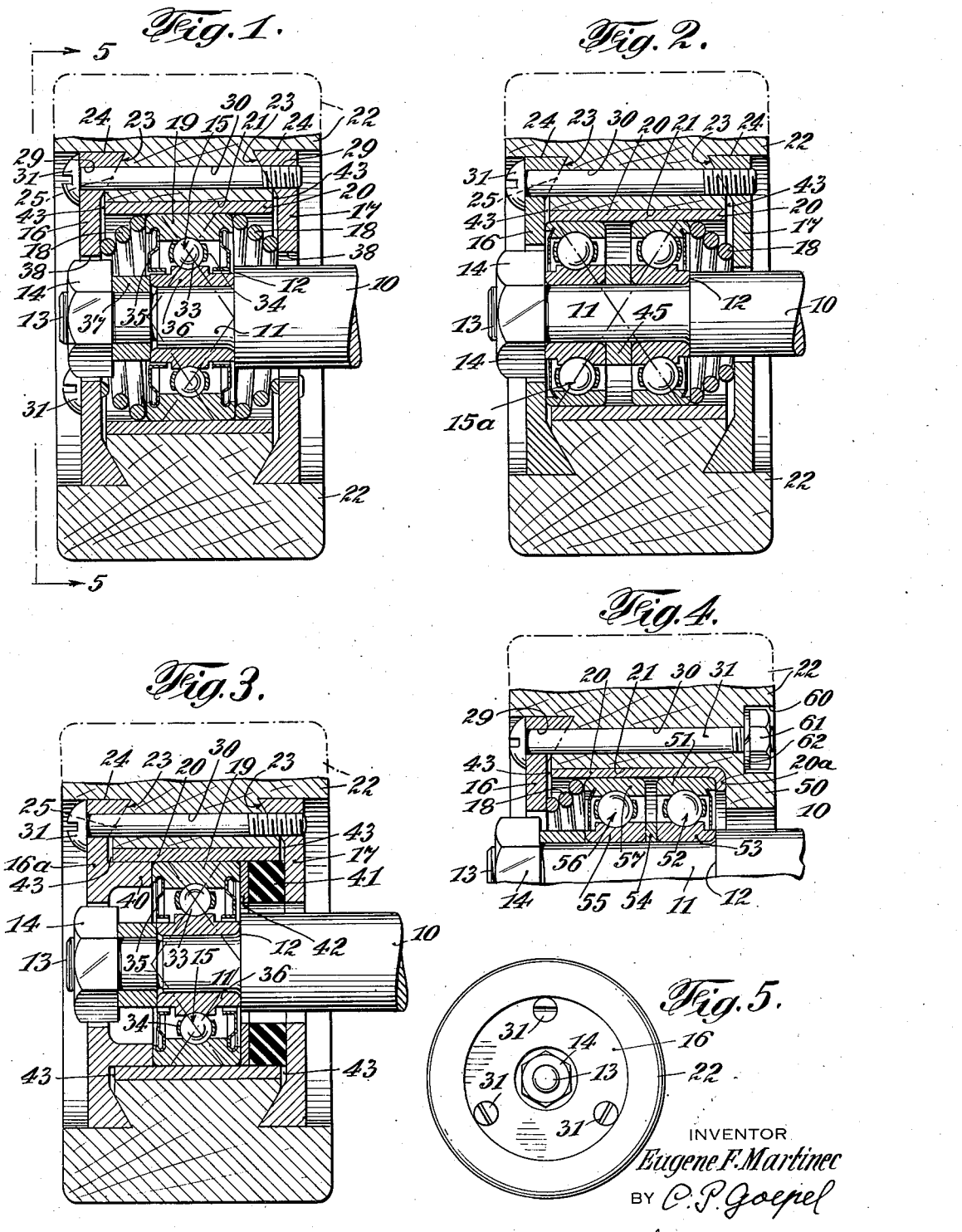
INVENTOR
Eugene F. Martinec
BY C. P. Goepel
his ATTORNEY Patented Apr. 19, 1949

2,467,437

UNITED STATES PATENT OFFICE 2,467,437

SKATE WHEEL STRUCTURE

Eugene F. Martinec, Cleveland, Ohio, assignor to Norma-Hoffmann Bearings Corporation, Stamford, Conn., a corporation of New York Application July 26, 1946, Serial No. 686,551

6 Claims. (Cl. 301—5.7)

1

This invention relates to skate wheel structures in which a shaft is rotatably connected with a tire by a bearing connection which includes one or more antifriction bearings.

In my U. S. Letters Patent No. 2,304,944, of December 15, 1942, and No. 2,357,597, of September 5, 1944, devices of this character have been shown and described.

The present improvement is the provision of diametrical abutment members supported by the tires enclosing antifriction bearings disposed on the shaft in the bore of the tire, whereby the assembling and disassembling of the skate wheel structure is readily carried out.

For this purpose, the invention consists of the combination of a shaft, a tire having a bore and a radially intervening antifriction bearing confined by radially extending abutment members secured to the tire, the antifriction bearings having their inner race ring on the shaft, and having the outer race ring secured to the tire for holding the same in position, with suitable resilient members confined by one or both of the abutment members.

The invention will be further described, embodiments shown in the drawings, and the invention will be finally pointed out in the claims.

In the accompanying drawings,

Fig. 1 is a radial section of one embodiment of the invention showing the use of one antifriction bearing held by a resilient member at each side of the antifriction bearing;

Fig. 2 is a radial section of another embodiment showing the use of a pair of antifriction bearings;

Fig. 3 is a radial section showing one antifriction bearing, with one of the abutments of a modified form;

Fig. 4 is a radial section of another embodiment, also showing the use of a pair of antifriction bearings; and Fig. 5 is an end view of Fig. 1 taken from line 5—5 of Fig. 1.

Similar characters of reference indicate corresponding parts throughout the various views.

Referring to the drawings, the shaft 10 has a subcaliber portion 11, and a shoulder 12. The end 13 is screw-threaded and is engaged by a fastening nut 14.

The means for attaching a standard antifriction ball bearing 15 on the shaft 10 to a tire consists in the employment of radial abutments 16 and 17, between which the antifriction bearing 15 is disposed. In one embodiment, the antifriction bearing 15 is spaced from each abutment by helical springs 18, each having its smaller end convolution bearing upon the inner surface of an abutment and its larger end convolution bearing upon the outer race ring 19 of the antifriction bearing 15. The outer race ring 19 is seated in a sleeve 20 having its bore milled or machined to provide a smooth and even fit with the outer circumferential surface of the outer race ring 19. Each end of the sleeve 20 terminates short of the adjacent inner surfaces of the abutments 16 and 17, so as to leave a space.

The outer circumferential surface of the sleeve 20 is huggingly fitted into the bore 21 of a tire 22. The tire 22, usually made of wood, has at each side thereof, a circumferential recess 23, formed by a circumferential axial shoulder 24 and by an inclined wall 25, the two converging inclined walls converging outwardly. Each abutment member 16, 17, has two or more openings 29, and one of the pair of abutment members has its openings screwthreaded. The tire 22 has a number of axial bores 30 corresponding to the number of openings 29. A bolt 31 passes through each of the openings 29 and corresponding bore 30, and the screwing home of the bolt 31 moves the abutment members 16 and 17 towards each other, and holds the abutments in position on the tire, and by means of the springs 18 holds the outer race ring 19 of the antifriction bearing 15 in position on the sleeve 20, the inner race ring 36 being held in position by the nut 14 and shoulder 12. The antifriction bearing includes balls 33 and a cage 34, with dust and lubricant seals 35. The outer race ring 19 is held in a fixed position on the inner surface of the sleeve 20 by the radial abutments 16 and 17. This tire-bearing ensemble is ready to be applied to the shaft 10, after the inner race ring 36 is slipped over the subcaliber portion 11 until it abuts against the shoulder 12, when a spacer collar 37 is slipped over the subcaliber portion 11, to hold the bearing 15 in position, after which the nut 14 is applied. The abutments 16 and 17 have openings 38 of larger diameter than the shaft diameter for the passage of the shaft.

When such a structure is used with two bearings, a spacer collar 45 is preferably placed on the subcaliber portion 11 of the shaft 10, and the nut 14 fits against the inner race ring of the adjacent bearing as shown in Fig. 2. As before described, the outer race rings of the bearings are disposed between the two abutments, and in the embodiment shown in Fig. 2, only one spring 18 is used.

In another embodiment (Fig. 3), and where only one resilient member is desired, one of the abutments as for instance 16a is provided with an inwardly extending flange 40 which at its inner end abuts against the outer race ring 19. In place of a helical spring, a rubber or rubber like ring 41 is used, and in this case, a metal ring 42 is employed of substantially the same surface area as one side of the rubber washer 41, the other side of the rubber ring 41 having its other surface area covered by the inner surface of the abutment 17.

In the embodiment shown in Fig. 4, the abutment 16 is like the abutment 16 of Figures 1 and 3, but the tire 22 has an inwardly extending part 50 which acts as an abutment. It is a part of the tire and is not replaceable like the abutment 17 of Figures 1, 2 and 3. Within the bore 21 of the tire the sleeve 20, has an inwardly extending part 20a the outer surface of which abuts against the abutment, and this part 20a serves as an abutment also, this part 20a and the extension 50 jointly acting to resist the movement of the outer race ring 51 of an antifriction bearing 52. The inner race ring 53 abuts against the shoulder 12 of the shaft 10. A collar 54 acts as a spacer to the adjacent inner race ring 55 of the antifriction bearing 56, the outer race ring 57 of which is pressed by the spring 18, the other end of which presses against the inner surface of the abutment 16. The sleeve 20 is press fitted to the bore of the tire. The openings 29 in the abutment 16, permit the passage therethrough of bolts 31 having heads, and having their other ends threaded. This side of the tire has a recess 60 for the nuts 61 and washers 62. Thus, by screwing on the nut, the abutment 16 is locked to the tire 22. Two or more such bolt connections may be used as shown in Figure 5.

The forms of springs shown are employed to provide compactness axially, but other forms of resilient devices, as the rubber ring as shown, may be used. The object of these devices is to hold the antifriction bearing in a locked position.

In all embodiments, the outer race rings are held against movement, either by a spring or rubber ring or by an abutment.

In all embodiments, the ends of the sleeve 20 are spaced from the abutments, as shown by the spaces 43, so that the tire will be clamped instead of the sleeve 20.

The use of the radially disposed abutments with their flanges engaging the recesses of the tire and with their sides parallel with each other, and extending radially towards the shaft, provide interchangeable parts, and a very simple and efficient method of holding the bearing mounting to the tire, enabling the parts to be readily assembled.

I have described several forms of my invention, but obviously various changes may be made in the details disclosed without departing from the spirit of the invention as set out in the following claims:

I claim:

1. In a skate wheel structure, the combination of a shaft, an antifriction bearing having its inner race ring on said shaft, a tire having a bore, a sleeve in said bore for holding its outer race ring, abutment members separate from said sleeve each secured to a side of said tire and extending parallel with each other radially inwards from both sides of the tire towards the shaft and enclosing said sleeve, and each having an opening for the passage of the shaft, and means acting upon the outer race ring of said antifriction bearing and upon the inner surfaces of the parallel abutments for holding the outer race ring in position axially of said tire.

2. In a skate wheel structure, the combination of a shaft, an antifriction bearing having its inner race ring on said shaft, a tire having a bore for holding its outer race ring, abutment members each secured to a side of said tire and extending parallel with each other radially inwards from both sides of the tire towards the shaft, and each having an opening for the passage of the shaft, means acting upon the outer race ring of said antifriction bearing and upon the inner surfaces of the parallel abutments for holding the outer race in position axially of said tire, and a sleeve interposed between the tire and the outer race ring and having its ends spaced from the abutments.

3. In a skate wheel structure, the combination of a shaft, an antifriction bearing having its inner race ring on said shaft, a tire having a bore for holding its outer race ring, abutment members each secured to a side of said tire and extending parallel with each other radially inwards from the tire towards the shaft, and each providing an opening for the passage of the shaft, means acting upon the outer race ring of said antifriction bearing, and upon the inner surfaces of the parallel abutments for holding the outer race ring in position axially of said tire, one of said inner surfaces being on a shoulder on one of said abutments extending axially inwards.

4. In a skate wheel structure, the combination of a shaft, an antifriction bearing having its inner race ring on said shaft, a tire having a bore for holding its outer race ring, abutment members each secured to a side of said tire and extending parallel with each other radially inwards from the tire towards the shaft, and having an opening for the passage of the shaft, means acting upon the outer race ring of said antifriction bearing, and upon the inner surfaces of the parallel abutments for holding the outer race ring in position axially of said tire, one of said abutments being formed integrally with the tire.

5. In a skate wheel structure, the combination of a tire having a bore and a circumferential recess at the side of the tire with an inclined wall, and having a bolt opening, an outer race ring engaging sleeve in said bore, an abutment member separate from said sleeve and having a central opening for the passage of a spaced shaft, and having an inclined wall in registration with the inclined wall of the tire, and having a bolt opening, a bolt passing through the bolt opening of the abutment member and of the tire, said bolt being adapted to hold the abutment member to the tire, the outer side of the abutment member and of the bolt being entirely within the plane passing through the side of the tire and the inner surface of the abutment extending beyond said sleeve for enclosing the same.

6. In a skate wheel structure having a shaft, the combination of a tire having a bore and a V-shaped circumferential recess at the side of the tire with an inclined wall, and having a bolt opening, an abutment member having a central opening for the passage of the shaft, and having an inclined wall in registration with the inclined wall of the tire, and having a bolt opening, a bolt passing through the bolt opening of the abutment member and of the tire, said bolt being adapted to hold the abutment member to the tire, an antifriction bearing disposed between the shaft and bore of the tire and having its inner race ring on the shaft and its outer race ring along the bore, and resilient means disposed between the outer race ring and abutment for holding the outer race ring.

EUGENE F. MARTINEC.

REFERENCES CITED

The following references are of record in the file of this patent:

UNITED STATES PATENTS

| Number | Name | Date |
|---|---|---|
| 1,469,344 | Ware | Oct. 2, 1923 |
| 2,304,944 | Martinec | Dec. 15, 1942 |